US010969272B2

(12) United States Patent
Narendran et al.

(10) Patent No.: US 10,969,272 B2
(45) Date of Patent: Apr. 6, 2021

(54) METHOD, SYSTEM, AND SENSOR ASSEMBLY FOR DETERMINING LIGHT COMPOSITION AT A TARGET LOCATION

(71) Applicant: RENSSELAER POLYTECHNIC INSTITUTE, Troy, NY (US)

(72) Inventors: Nadarajah Narendran, Troy, NY (US); Yiting Zhu, Troy, NY (US); Jean Paul Freyssinier, Troy, NY (US); Yi-Wei Liu, Troy, NY (US); Dinusha Thotagamuwa, Troy, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 68 days.

(21) Appl. No.: 16/098,470

(22) PCT Filed: May 2, 2017

(86) PCT No.: PCT/US2017/030548
§ 371 (c)(1),
(2) Date: Nov. 2, 2018

(87) PCT Pub. No.: WO2017/192518
PCT Pub. Date: Nov. 9, 2017

(65) Prior Publication Data
US 2019/0094070 A1    Mar. 28, 2019

Related U.S. Application Data

(60) Provisional application No. 62/330,629, filed on May 2, 2016, provisional application No. 62/492,551, filed on May 1, 2017.

(51) Int. Cl.
*G01J 1/42* (2006.01)
*G01J 3/36* (2006.01)
*H05B 47/155* (2020.01)
*G01J 5/60* (2006.01)
(Continued)

(52) U.S. Cl.
CPC ........... *G01J 1/4228* (2013.01); *G01J 1/4204* (2013.01); *G01J 3/36* (2013.01); *G01J 3/505* (2013.01);
(Continued)

(58) Field of Classification Search
CPC . G01J 3/505; G01J 1/4204; G01J 5/60; H05B 47/155; H04N 5/235
See application file for complete search history.

(56) References Cited

U.S. PATENT DOCUMENTS 4,914,738 A * 4/1990 Oda ...................... G01J 1/4228
348/E5.034
2002/0180973 A1 * 12/2002 MacKinnon ......... H05B 47/155
356/425
(Continued)

OTHER PUBLICATIONS

International Search Report and the Written Opinion of the International Searching Authority, International Application PCT/US2017/030548, dated Jul. 6, 2017.

*Primary Examiner* — Dominic J Bologna
(74) *Attorney, Agent, or Firm* — Murtha Cullina LLP; Anthony P. Gangemi (57) ABSTRACT

Methods and systems for modulating a manufactured light source are disclosed. Methods and systems of the present disclosure include sensor assemblies having first and second light sensors to retrieve light spectrum data at a target location, such as from a surface in an interior space at a home, office, or commercial building, that also receives daylight exposure. The first light sensor retrieves the light spectrum data within a spectrum of the manufactured light source. The second light sensor retrieves light spectrum data outside of the spectrum of the manufactured light source, yet within the spectrum of daylight. The light spectrum data is used to define spectral characteristics at the target location, such as a ratio of daylight to the manufactured light source,
(Continued)

phase of daylight, and average overall quantity, which are used to maximize light-associated benefits of the spectral composition for the occupants at the target location, such as humans, plants, and animals.

19 Claims, 5 Drawing Sheets (51) Int. Cl.
  *H04N 5/235* (2006.01)
  *H04N 9/73* (2006.01)
  *G01J 3/50* (2006.01)
(52) U.S. Cl.
  CPC ............... *G01J 5/60* (2013.01); *H04N 5/235* (2013.01); *H04N 9/735* (2013.01); *H05B 47/155* (2020.01)

(56) References Cited

U.S. PATENT DOCUMENTS

| | | | |
|---|---|---|---|
| 2005/0041292 A1* | 2/2005 | Wheatley | G01J 1/42 359/584 |
| 2009/0096895 A1* | 4/2009 | Benezra | H04N 9/735 348/234 |
| 2011/0047867 A1* | 3/2011 | Holland | G01J 3/10 47/1.5 |
| 2012/0051045 A1* | 3/2012 | Harbers | G01J 3/462 362/235 |
| 2015/0223402 A1* | 8/2015 | Krijn | A01G 7/045 47/58.1 LS |
| 2016/0369991 A1* | 12/2016 | Lim | F21V 23/0471 |

\* cited by examiner

FIG. 5

METHOD, SYSTEM, AND SENSOR ASSEMBLY FOR DETERMINING LIGHT COMPOSITION AT A TARGET LOCATION

CROSS REFERENCE TO RELATED APPLICATION(S)

This application is a national stage filing of International Patent Application No. PCT/US2017/030548, filed May 2, 2017, which claims the benefit of U.S. Provisional Application Nos. 62/330,629, filed May 2, 2016, and 62/492,551, filed May 1, 2017, which are incorporated by reference as if disclosed herein in their entirety.

BACKGROUND

Light has been shown to fundamentally benefit human lives, from safety to wealth-enhancement to well-being. Beyond its obvious applications as a tool for prolonging human activities after dark, the basic cycle of day and night (light and dark) has been found to be a stimulus that regulates circadian rhythms in most if not all living organisms. It is widely accepted that circadian regulation supports health and well-being in humans through the regulation of internal biological processes such as hormones secretion and sleep patterns.

Sensitivity to light by plants and other animal species is different from human visual sensitivity, but light-associated effects in these species are no less profound. In plants, light influences photosynthesis as well as daily and/or seasonal flowering, blooming, morphology, and resistance to pathogens. In animals, light has been shown to influence processes such as milk production by cows and egg laying by chickens.

Manufactured lighting for commercial applications has long been skewed to supporting visual tasks of occupants with a minimum use of energy. However it is widely accepted that daylight is preferable to manufactured lighting, for reasons such as increased light levels, balanced spectral composition, and circadian regulatory effects. Therefore, most modern interior spaces have been designed with lighting conditions that do not adequately support circadian regulation.

Architects aim to increase the availability of daylight in buildings, particularly in those where people spend most of their days, such as offices, schools, and industry buildings. However, there is not much information on how spaces can and should be designed to maximize the well-being of occupants through daylight exposure. Sustainable design practices, such as the United States Green Building Council through their LEED Certification process, require architects and designers to include daylight in buildings in order to achieve certification credits. The availability of daylight in buildings can be calculated in different ways, often using computer programs and databases. While the availability of daylight in a given space can be modeled as a function of time of day as well as seasonally, these values are only calculated and reported for a few instances with the intent to inform design decisions in terms of insolation and shadowing. Additionally, daylight databases are not available for all geographical regions and often are based on statistical information, rather than measured data.

These daylight metrics are at best considered during the design phase of the building and are not monitored once the occupants are in the space. Furniture layout, surface finishes and other changes that happen in the space are known to affect the distribution of daylight across the space and cannot be fully anticipated.

Various photosensor systems attempt to monitor environmental light levels, often with the goal of increasing manufactured light in a space as daylight fades. However, existing photosensor systems do not differentiate between the contributions from manufactured light and daylight. Further, while manufactured light levels may be adjusted to compensate for lost daylight, current photosensor systems cannot adjust the spectral composition of the environmental light to account for changes in the daylight composition throughout the day, and better realize the associated benefits, such as those associated with circadian stimulation.

SUMMARY

Some embodiments of the disclosed subject matter are directed to systems and methods including sensor assemblies for analyzing a spectral composition at a target location utilizing a plurality of light sensors to output instructions on how to modulate a manufactured light source and achieve increased light-associated benefits, such as alertness, support of visual tasks, circadian stimulation for proper entrainment, and overall appearance of the space (including brightness), etc. for humans; photosynthesis (growth stimulation), photomorphology (control of the size and shape of the plant, e.g., bushy vs. taller stem), nutrient, texture and flavor content control and consistency over a given timespan (as opposed to natural seasonal or geographical variation due to daylight changes), and pathogen control, etc. for plants; and farming benefits such as poultry growth and/or egg production, cow milk production, etc. in animals and combinations thereof. A first light sensor retrieves light spectrum data at the target location within the spectrum of a manufactured light source. Second and third sensors retrieve light spectrum data at the target location outside of the spectrum of the manufactured light source, yet within the spectrum of daylight.

These data are used to calculate the quantity of light at the target location, the ratio of daylight to manufactured light at the target location, and the phase of the daylight at the target location. As used herein, the term "phase" refers to the color or temperature of the light and the light spectrum associated with that color or temperature. For example, daylight chances throughout the day, tending to be more blue-white in the mornings and red-white later in the afternoon. These spectral characteristics inform a control module how to instruct a manufactured light source to adjust the quantity and phase of light therefrom so as to emit light providing the maximum light-associated benefit to the target location. Further, by providing an array of sensors, a larger portion of or an entire environment can be analyzed to enable comprehensive spectral composition control therein, including the ability to vary manufactured light source modulation instructions across an array of manufactured light sources dispersed throughout the environment.

BRIEF DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein.

DETAILED DESCRIPTION

Figure 1:
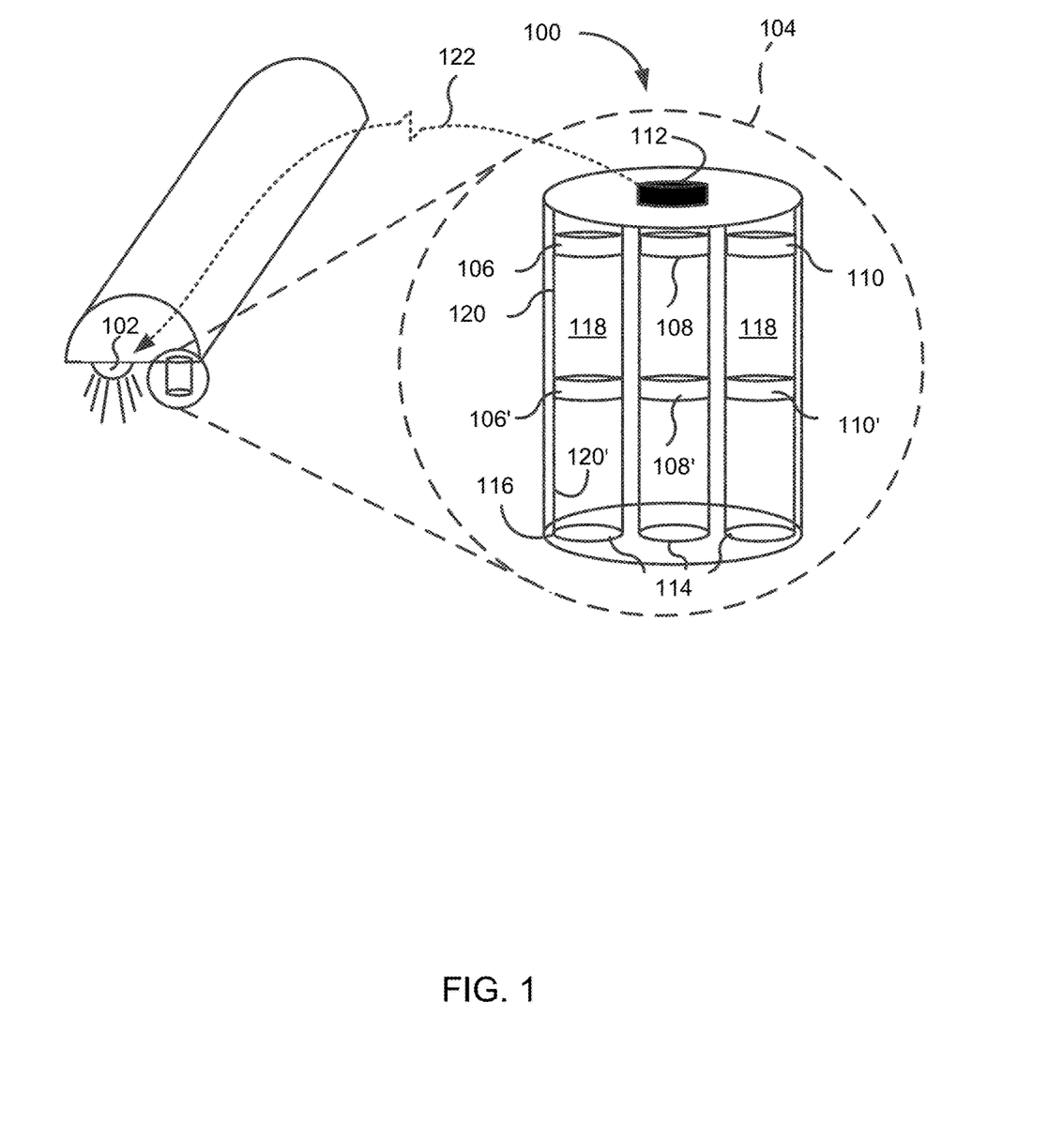
FIG. 1 is a schematic drawing of a system for determining light composition at a target location according to some embodiments of the present disclosure.

Referring now to FIG. 1, aspects of the disclosed subject matter include a system 100 for modulating a light source 102. Some embodiments of system 100 include a sensor assembly 104, which includes a first light sensor 106, a second light sensor 108, and a third light sensor 110, and a control module 112 in communication with the sensor assembly. In some embodiments, system 100 includes a plurality of sensor assemblies 104. Sensor assembly 104 is installed substantially adjacent to light source 102 and measures both manufactured light and daylight in an area. Control module 112 is in direct or indirect communication with light sensors 106, 108, and 110 and light source 102 to control the light source, as discussed below.

As mentioned above, sensor assembly 104 includes first light sensor 106, second light sensor 108, and third light sensor 110, each of which is positioned in either a separate or single housing 114. While the embodiments of the present disclosure predominantly describe sensor assemblies 104 with three light sensors, in some embodiments only two sensors are used, i.e., there is no third light sensor 110. Sensor assemblies with three or more sensors, i.e., with light sensors 106, 108, and 110 or additional light sensors, exhibit increased accuracy over those with two sensors. Light sensors 106, 108, and 110 are positioned to retrieve light spectrum data, such as measure radiant power density, at a target location from light source 102 and the sun, as will be discussed below. In some embodiments, light sensors 106, 108, and 110 have corresponding first 106', second 108', and third 110' bandpass filters. Bandpass filters 106', 108', and 110' are positioned in housing 114 to filter light transmitted to light sensors 106, 108, and 110 respectively. Some embodiments of sensor assembly 104 include additional sensors (not shown). In some embodiments, at least one additional sensor is calibrated approximately with photopic luminous efficiency, for example as an analogue for the human eye. In some embodiments, the at least one additional sensor is configured for use as a reference sensor. In some embodiments, each of light sensors 106, 108, and 110 is a photodiode, photoconductive device, photovoltaic cell, phototransistor, light-emitting diodes in reverse bias, or a combination thereof. In some embodiments, light sensors 106, 108, and 110 are light-emitting diodes in reverse bias and no associated bandpass filters are provided. In some embodiments, each of light sensors 106, 108, and 110 is a silicon photodiode. In some embodiments, each of light sensors 106, 108, and 110 includes dielectric coatings.

Referring again to FIG. 1, sensor assembly 104 includes a corresponding housing 114 in which each of light sensors 106, 108, and 110 and bandpass filters 106', 108', and 110' are positioned. Each housing 114 includes an open end 116 and an interior 118. Open end 116 allows light to pass through to interior 118 and thus through to a bandpass filter, e.g., bandpass filters 106', 108', and 110'. In some embodiments, bandpass filters 106', 108', and 110' are positioned at or adjacent open end 116. In some embodiments, bandpass filters 106', 108', and 110' are positioned at or adjacent associated light sensors 106, 108, and 110, respectively. As shown in FIG. 1, some embodiments of sensor assembly 104 have separate housings 114 for each sensor. In some embodiments, sensors and bandpass filters, e.g., light sensors 106, 108, and 110 and bandpass filters 106', 108', and 110', are included in the same housing (not shown).

In some embodiments, housing 114 is hollow prism shaped and includes a wall 120, which surrounds a sensor and a bandpass filter, e.g., light sensors 106, 108, and 110 and bandpass filters 106', 108', and 110'. Wall 120 includes an interior wall 120'. In some embodiments, interior wall 120' is configured to prevent reflection of light. Some embodiments of wall 120' prevent reflections by having darkly colored surfaces, e.g., black, by having surfaces with a matte finish, by having rough surface topographies, by having surfaces with a reflection limiting coating, by being composed of a reflection limiting material, or a combination thereof.

Control module 112 is in direct or indirect communication with light sensors 106, 108, and 110 and light source 102 to control the light source. Control module 112 is configured to generate and/or send a signal to modulate a quantity and a phase of light emitted by light source 102. As discussed above, light sensors 106, 108, and 110 are positioned to measure a radiant power density of light at a target location. Measurements taken by light sensors 106, 108, and 110 around their respective spectral sensitivity peaks inform control module 112 about the radiant power density of light at the target location and the relative contributions to the light at the target location from light source 102 and the sun. This information allows control module 112 to calculate spectral characteristics of the light at the target location and generate a signal to be communicated to light source 102 to adjust a quantity and/or a phase of the light from the light source based on those characteristics to achieve improved lighting conditions and/or light-associated benefits at the target location as discussed elsewhere in this disclosure. In some embodiments of system 100, the spectral characteristics include a ratio of daylight to light from light source 102, phase or color temperature of daylight, and average overall quantity of light, or a combination thereof. By way of example, the phase of the light from light source 102 may be adjusted to match the color temperature of daylight entering an office for a more natural lighting appearance as it changes throughout the day, yet compensate for the variations in quantity of daylight (due to cloud cover or solar motion) by increasing or decreasing quantity of light from the light source to maintain a substantially constant overall quantity of light at the target location through the day as well.

Still referring to FIG. 1, control module 112 produces and sends a signal 122 to light source 102 to modulate and thereby adjust the light emitted from the light source. In some embodiments, control module 112 sends signal 122 to a controller (not shown) that is itself configured to adjust the light from light source 102. In some embodiments, system 100 is integrated with a network of "smart" devices. In these embodiments, the controller can be a smart device hub which is responsible for controlling one or more networked devices with an environment, such as a home or office. In some embodiments, control module 112 is in wireless communication with light source 102 or a controller that controls that light source. Some embodiments of this communication are via Bluetooth, WI-FI, near-field communication, cellular radio, radio frequency, infrared, visible modulated light, or a combination thereof. In some embodiments, control module 112 is in wired communication with light source 102 or a controller that controls that light source.

Light sensors 106, 108, and 110 have a spectral sensitivity peak corresponding to where detection efficiency of light is the highest. First light sensor 106 is dedicated to retrieving light spectrum data at a target location that is emitted from light source 102. Therefore, first light sensor 106 has a spectral sensitivity peak within a spectral range of light source 102. Second light sensor 108 and third light sensor 110 are dedicated to retrieving spectrum data related to the daylight at the target location. Therefore, second light sensor 108 and third light sensor 110 have corresponding spectral sensitivity peaks within a spectral range of daylight but outside the spectral range of light source 102. In embodiments with only two light sensors, second light sensor 108 is still dedicated to retrieving spectrum data related to the daylight at the target location, and still has a corresponding spectral sensitivity peak within a spectral range of daylight but outside the spectral range of light source 102.

Figure 2:
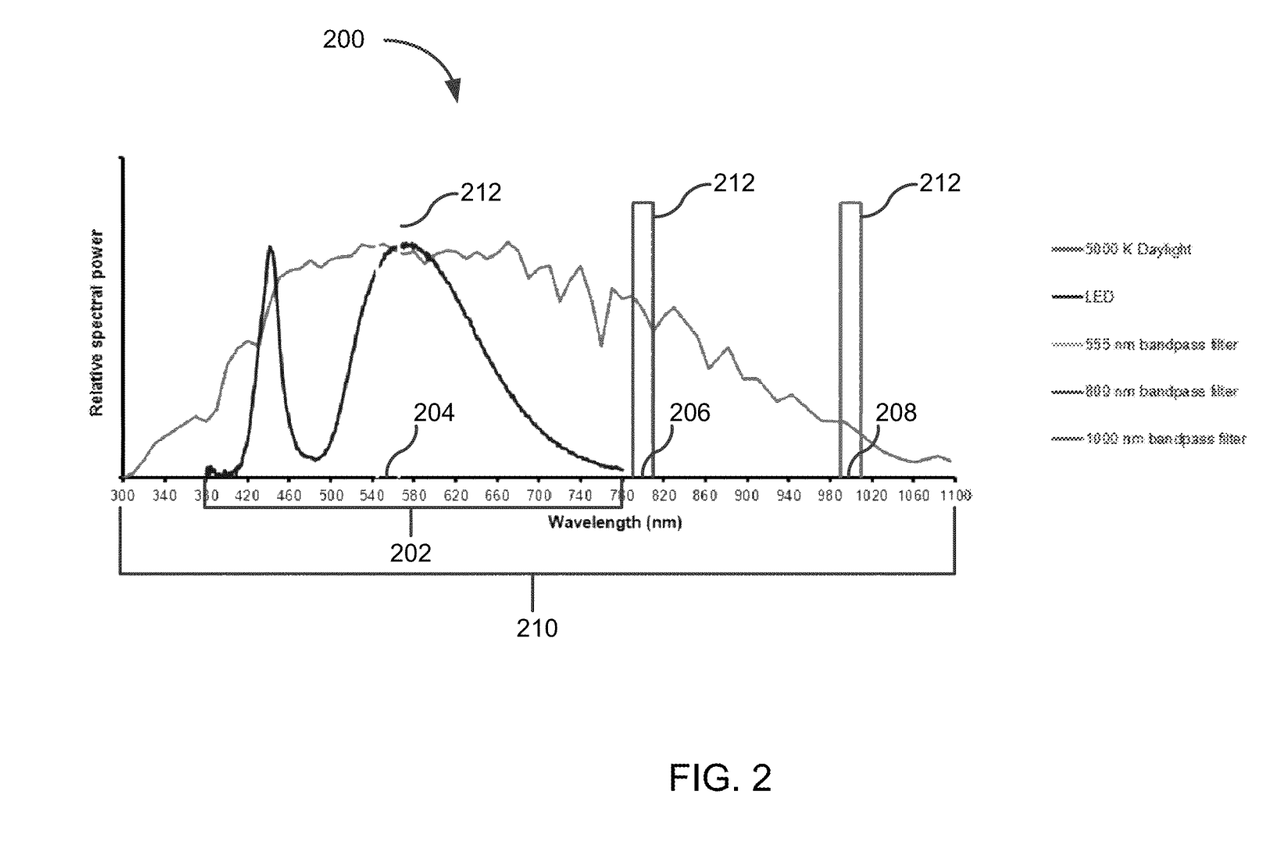
FIG. 2 is a chart of a light spectrum exhibiting sensor properties according to some embodiments of the present disclosure.

Referring now to FIG. 2, a spectral chart 200 at a hypothetical target location is depicted as an exemplary application of some embodiments of system 100. The numbered spectral values and ranges identified in FIG. 2 are meant as an exemplary embodiment, and different values and ranges may be used depending on the specific application of system 100. In some embodiments, light source 102 has a spectral range 202. As discussed above, first light sensor 106 includes a first spectral sensitivity peak 204 within spectral range 202 of light source 102. The spectral range of most if not all commercial light sources spans the peak photopic luminous efficiency value at 555 nm. In some embodiments of system 100, first spectral sensitivity peak 204 is about 555 nm.

Still referring to FIG. 2, second light sensor 108 and third light sensor 110 include corresponding second 206 and third 208 spectral sensitivity peaks within a spectral range 210 of daylight and outside light source spectral range 202. In some embodiments of system 100, second spectral sensitivity peak 206 is just beyond light source spectral range 202. For example, in FIG. 2 where light source spectral range 202 ends at about 780 nm, second spectral sensitivity peak 206 is as at about 800 nm. In some embodiments (not shown), second spectral sensitivity peak 206 is below light source spectral range 202, such as at about 350 nm to 450 nm. In some embodiments of system 100, third spectral sensitivity peak 208 is closer to the ultraviolet, near-ultraviolet, infrared, or near-infrared regions of the spectrum. For example, in FIG. 2, third spectral sensitivity peak 206 may be in a range from about 990 nm to 1010 nm.

As discussed above, bandpass filters 106', 108', and 110' are positioned in interior 118 of housing 114 to filter light transmitted to light sensors 106, 108, and 110 respectively. Referring again to FIG. 2, in some embodiments, bandpass filters 106', 108', and 110' filter light transmitted to light sensors 106, 108, and 110, respectively, to isolate narrower spectrum ranges for each associated sensor, such as ranges 212. In some embodiments of system 100, ranges 212 for each sensor include the spectral sensitivity peaks for that sensor. Some embodiments of range 212 have a width of about 10 nm to about 20 nm.

In some embodiments, light source 102 is a color-tunable light source. As a color-tunable light source, light source 102 is capable of emitting different phases, or temperatures, of white light. In some embodiments, light source 102 is capable of emitting light across the visible spectrum. In some embodiments, light source 102 is capable of emitting light outside the visible spectrum. In some embodiments, light source 102 is a manufactured light source, i.e., the light is produced by a man-made apparatus or man-initiated process. In some embodiments, light source 102 is an electric light source. In some embodiments, light source 102 is a light-emitting diode, fluorescent light, discharge light, solid-state light, or a combination thereof.

As discussed above, light has been shown to have a regulatory effect on circadian rhythms, and circadian regulation has been shown to have associated benefits to humans, animals, and plants. Therefore, measuring a quantity or a phase of light transmitted to a target location allows system 100 to map the ability of a target location to provide light-associated benefits for a human, plant, and/or animal. In some embodiments, an algorithm is used to calculate the spectral characteristics of the light at the target location that describe the light-associated benefit capabilities at that location and inform what, if any, modulation of the light transmitted to that location may improve the light-associated benefit capabilities. The radiant power density measurements at a target location by first light sensor 106 quantify the quantity of light, i.e., manufactured light+daylight, at the target location. The radiant power density measurements of second light sensor 108 (and additional light sensors such as third light sensor 110) quantify the quantity of light from outside the manufactured light source spectrum and thus the distribution of light, i.e., manufactured light and daylight, measured by first light sensor 106. By knowing the daylight measurements at both first light sensor 106 and second light sensor 108 (and additional light sensors such as third light sensor 110), the color of the light can be calculated using a slope of these measurements as applied to known spectra representing the range of phases, i.e., colors/temperatures, of daylight.

In some embodiments, the calculated spectral characteristics provide a map of the light at the target location. By measuring the light across an environment or a part of an environment, the map shows the distribution of light within that environment, even as a function of time. When this distribution is known, the environment can be designed or redesigned to maximize the light-associated benefits of the environment. For example, furniture may be rearranged to place a desk in a position to receive more light or more consistent light. Similarly, an office may be re-designated as a conference room when the lighting in that office is discovered to provide a poor work environment. Further, certain plants may be moved from one part of a nursery to another to take advantage of more beneficial light conditions identified there.

In some embodiments, the algorithm compares the spectral characteristics at the target location with an optimized set of spectral characteristics. Where the current spectral characteristics at a target location deviate from the optimized set of spectral characteristics, in some embodiments, the algorithm determines what adjustments to the quantity or phase of light source 102 would bring the current spectral characteristics into agreement with the optimized set. Control module 112 then sends a signal to make those adjustments. In some embodiments, the optimized set of spectral characteristics attempt to provide light-associated benefits to a human, animal, and/or plant at a target location such as maximizing productivity, mental health, alertness, circadian stimulation for proper entrainment, support of visual tasks, overall appearance of the space, plant growth and/or care benefits, such as photosynthesis, desired photomorphology, nutrient, texture and flavor content control and consistency, pathogen control, benefits associated with production animals, e.g., cows, chickens, pigs, sheep, goats, etc., and/or their care such as poultry growth and/or egg production, cow milk production, etc., and combinations thereof. For example, light source 102 might be signaled to provide light so as to maintain a circadian stimulation value of about 0.3 to about 0.5 in morning hours, but then be signaled so as to maintain a circadian stimulation value of about 0.1 to about 0.3 in late afternoon hours. As a further example, photo synthetically active radiation and/or blue-to-red ratio might be supplemented or modulated to provide growth benefits to plants that are disposed in a location without adequate sunlight. In some embodiments, the optimized set of spectral characteristics are dependent on and vary with time of day, day of the week, season of the year, position of a target location in an environment, photosynthetically active radiation, blue-to-red ratio, brightness, alertness, human visual vision, circadian regulation, plants at the target location, animals at the target location, and combinations thereof and the like.

Figure 3:
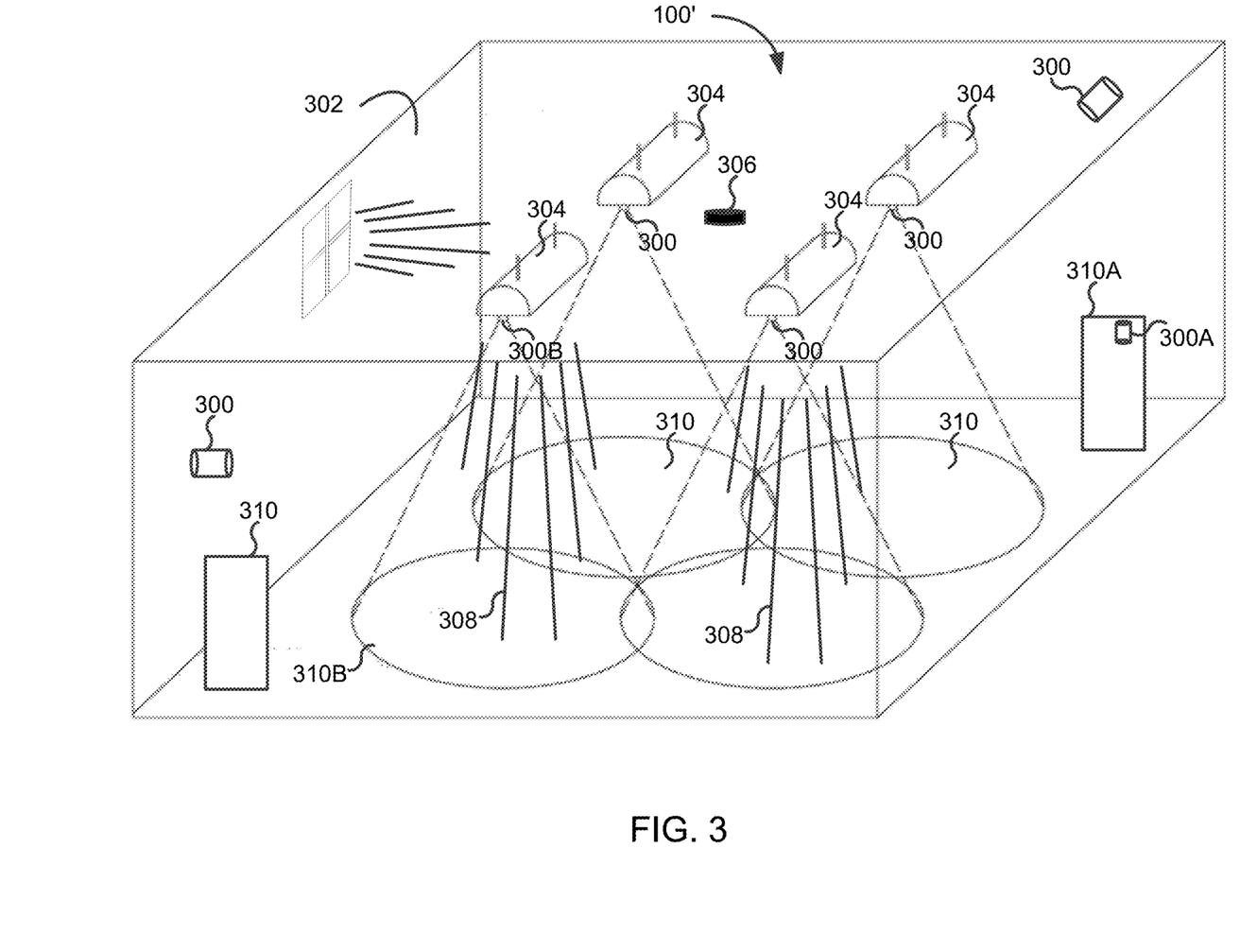
FIG. 3 is a schematic drawing of a system for determining light composition at a target location according to some embodiments of the present disclosure.
Figure 4:
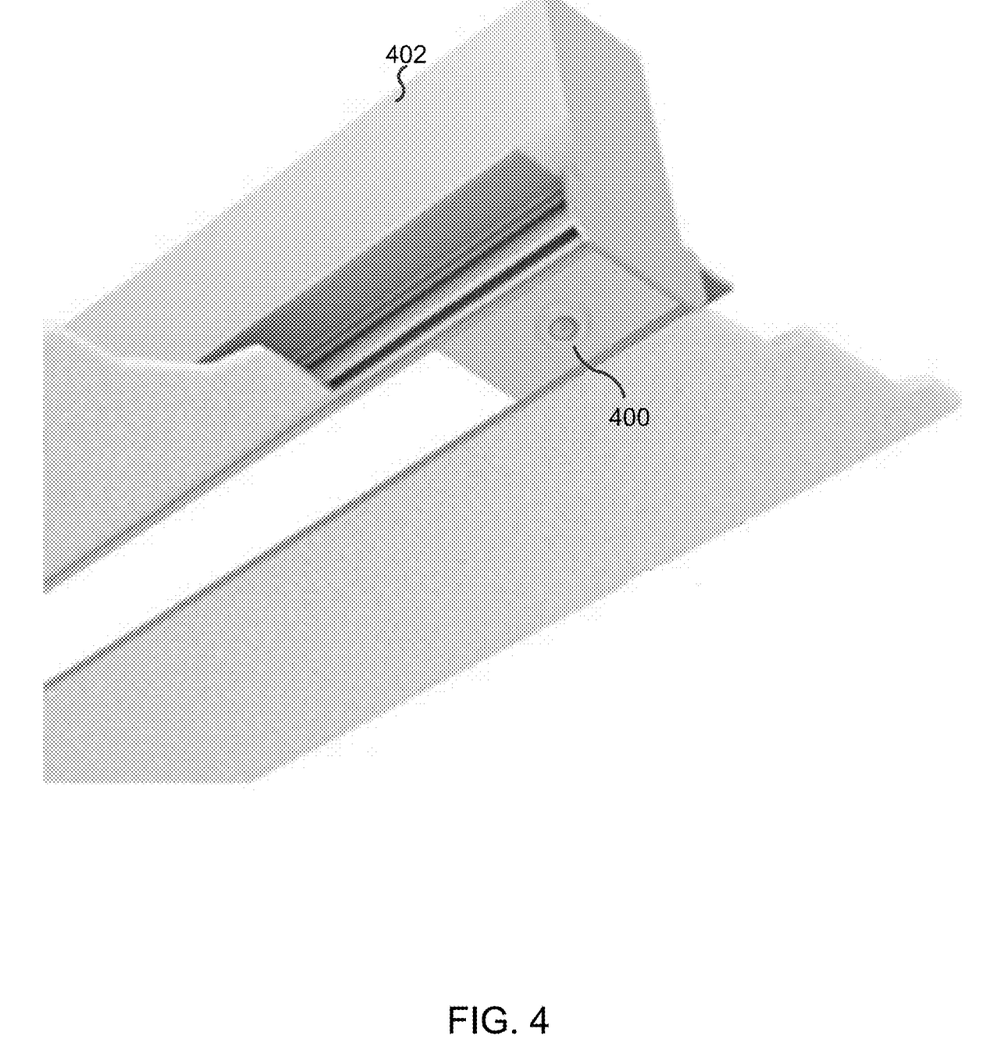
FIG. 4 is a schematic drawing of a system for determining light composition at a target location according to some embodiments of the present disclosure.

Referring now to FIG. 3, as discussed above, some embodiments include a system 100', which has a plurality of sensor assemblies 300 installed in an environment 302, such as a home or an office. In some embodiments, some sensor assemblies 300 are installed adjacent to light source 304. Referring now to FIG. 4, in some embodiments, some sensor assemblies 400 are installed as part of light source 402. Referring again to FIG. 3, in some embodiments, some sensor assemblies 300 may be installed remote from light source 304. In some embodiments, some sensor assemblies 300 may be installed in a portable device, such as a handheld electronic device like a smart phone. System 100' includes a control module 306. Each of plurality of sensor assemblies 300 is positioned to measure a radiant power density of light 308 at a target location 310 throughout environment 302. Some sensor assemblies 300 may be installed within a target location 310 to measure light 308 at that location e.g., see pair 300A, 310A. For example, a sensor assembly may be installed in the surface of a desk (at which a person is likely to spend a large amount of time looking) to measure the light falling on it. Some sensor assemblies 300 may be installed remote from a target location 310 but are positioned to measure the light 308 at that location, e.g., see pair 300B, 310B. For example, a sensor assembly may be installed in a ceiling light fixture to measure the light on the floor below it.

Still referring to FIG. 3, some embodiments of system 100' modulate a plurality of light sources 304. In some embodiments, system 100' modulates each of the plurality of light source 304 individually. In these embodiments, a plurality of sensor assemblies 300 are positioned to comprehensively measure the light in an environment 302. The light sources 304 are then modulated on a case by case basis to achieve a desired spectral composition in an environment 302, such as consistent light quantity and phase throughout, or varied quantity and/or phase across the environment (such as stronger and warmer light at a desk, but weaker near a sitting area).

Figure 5:
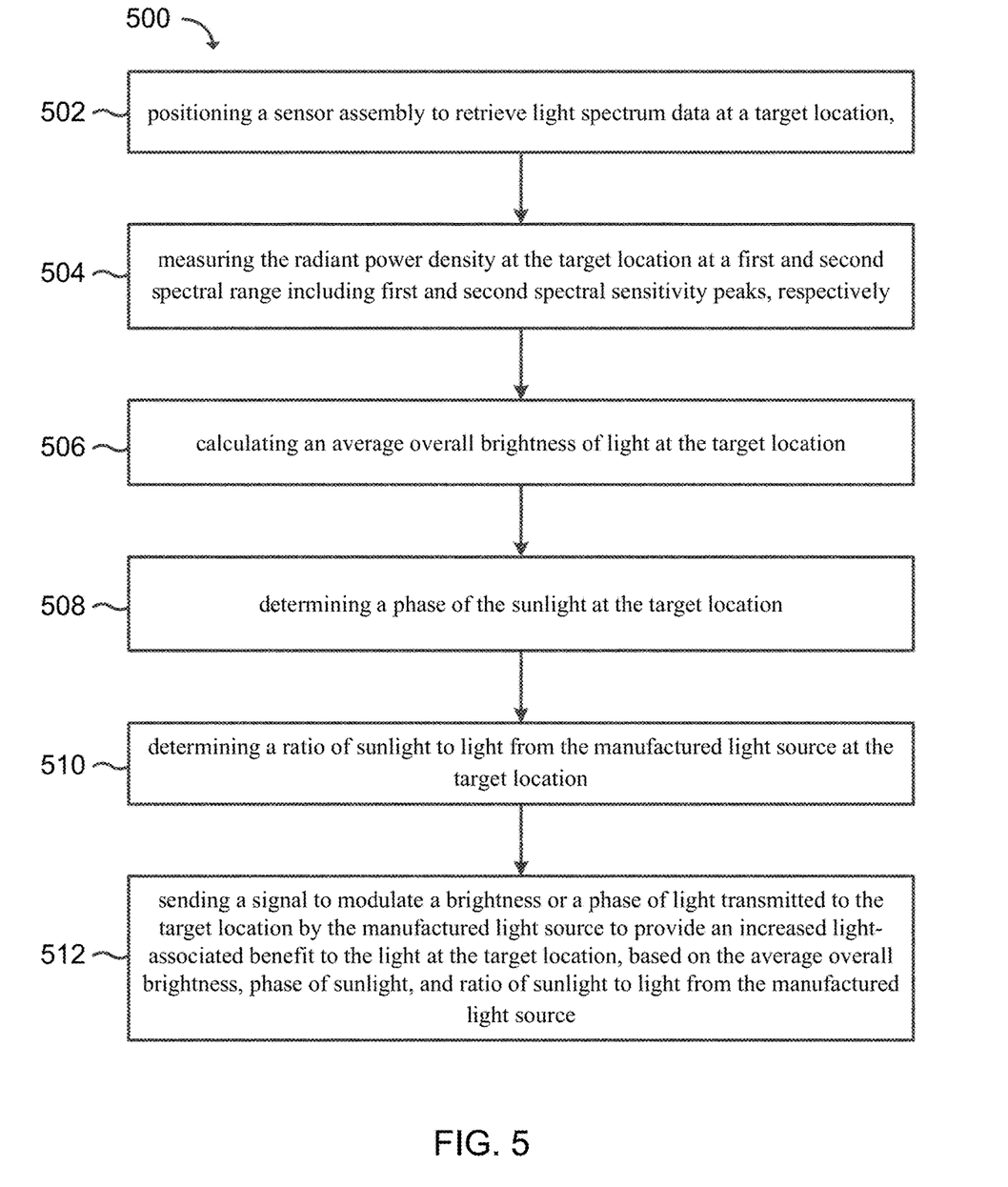
FIG. 5 is a chart of a method for modulating a light source according to some embodiments of the present disclosure.

Referring now to FIG. 5, some embodiments of the disclosed subject matter include a method 500 for modulating manufactured light sources. In some embodiments, at 502, a sensor assembly is positioned to retrieve light spectrum data at a target location. As discussed above, some embodiments of the sensor assembly include a first light sensor having a first spectral sensitivity peak within a manufactured light spectral range, and a second light sensor having a corresponding second spectral sensitivity peak within a spectral range of daylight and outside the manufactured light spectral range. As discussed above, some embodiments include a third light sensor having an associated third spectral sensitivity peak within a spectral range of daylight and outside the manufactured light spectral range. In some embodiments, light to the various sensors of the sensor assembly is filtered by an associated bandpass filter. At 504, light spectrum data such as radiant power density is measured at the target location. In some embodiments, the radiant power density is measured at first and second (and in some embodiments, third) spectral ranges including the first and second (and in some embodiments, third) spectral sensitivity peaks, respectively.

At 506, an average overall quantity of light at the target location is calculated. At 508, a phase of the daylight at the target location is determined. At 510, a ratio of daylight to light from the manufactured light source at the target location is determined. At 512, a signal to modulate a quantity or a phase of light is transmitted to the target location by the manufactured light source to provide an increased light-associated benefit to the light at the target location. As discussed above, in some embodiments, quantity and/or phase modulations at 512 are based on the average overall quantity, phase of daylight, and ratio of daylight to light from the manufactured light source.

As discussed above, tangible light-associated benefits have been attributed to regular interaction with natural light and light cycles. Systems and methods of the present disclosure make these light-associated benefits more accessible to humans, animals, and plants, particularly those in interior environments where humans, animals, and plants may be less likely to receive those light-associated benefits. Sensor assemblies according to the disclosed subject matter analyze the environment in which the person is located to map the spectral composition therein, including to what extent natural daylight is filling the environment and how that daylight is being perceived by the persons. If this mapping shows the spectral composition in the room is limiting the user's ability to realize the benefits of light interaction, or if the current presence of a manufactured light sources is distracting or unnecessary, the system is able to modulate manufactured light sources to not only provide short-term practical benefits but long-term light-associated benefits as well.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed is:

1. A method for determining light composition at a target location comprising:
  positioning a sensor assembly to retrieve light spectrum data at a target location, said sensor assembly comprising a housing including a first light sensor positioned in a first sub-housing, and a second light sensor positioned in a second sub-housing, the first light sensor having a first spectral sensitivity peak within a manufactured light spectral range, and the second light sensor having a corresponding second spectral sensitivity peak within a spectral range of daylight and outside said manufactured light spectral range;

measuring the radiant power density at said target location at a first and a second spectral range including said first and second spectral sensitivity peaks, respectively;

calculating an average overall quantity of light at said target location;

determining a phase of the daylight at said target location; and determining a ratio of daylight to light from a manufactured light source at said target location;

wherein said sensor assembly is installed in said manufactured light source.

2. The method according to claim 1, further comprising sending a signal to modulate a quantity or a phase of light transmitted to said target location by said manufactured light source to provide an increased light-associated benefit to the light at said target location, based on said average overall quantity, phase of daylight, and ratio of daylight to light from said manufactured light source.

3. The method according to claim 1, wherein positioning a sensor assembly to retrieve light spectrum data from a target location further comprises installing a second sensor assembly in said target location.

4. The method according to claim 1, wherein said first and second spectral ranges are about 10 nm to about 20 nm wide.

5. The method according to claim 1, wherein said first spectral sensitivity peak is about 555 nm.

6. The method according to claim 1, wherein said second spectral sensitivity peak is about 350 nm or about 800 nm.

7. The method according to claim 1, wherein the sensor assembly further comprises a third light sensor positioned in a third sub-housing of the housing, the third light sensor having a corresponding third spectral sensitivity peak within a spectral range of daylight and outside said manufactured light spectral range.

8. A sensor assembly for determining light composition at a target location comprising:
a housing including a plurality of sub-housings, each of the plurality of sub-housings having an end configured to allow light into the sub-housing;
a first light sensor positioned in a first sub-housing of the plurality of sub-housings, the first light sensor having a first spectral sensitivity peak within a manufactured light spectral range;
a second light sensor positioned in a second sub-housing of the plurality of sub-housings, the second light sensor having a second spectral sensitivity peak within a spectral range of daylight and outside said manufactured light spectral range;
a first bandpass filter positioned in the first sub-housing to filter light transmitted to the first light sensor; and
a second bandpass filter positioned in the second sub-housing to filter light transmitted to the second light sensor;
wherein said first light sensor and said second light sensor are configured to measure radiant power density at said target location.

9. The sensor assembly according to claim 8, further comprising a control module for sending a signal to modulate a quantity and a phase of light transmitted by a manufactured light source according to a spectral characteristic determined by said first and second light sensor radiant power density light measurements, said spectral characteristic being a ratio of daylight to said manufactured light source, phase of daylight, and average overall quantity, or a combination thereof.

10. The sensor assembly according to claim 8, further comprising:
a third light sensor positioned in a third sub-housing of the plurality of sub-housings of the housing, the third light sensor having a corresponding third spectral sensitivity peak within a spectral range of daylight and outside said manufactured light spectral range; and
a third bandpass filter positioned in the third sub-housing to filter light transmitted to said third light sensor.

11. The sensor assembly according to claim 10, wherein said third spectral sensitivity peak is at 350 nm or in a range from about 990 nm to 1010 nm.

12. The sensor assembly according to claim 8, wherein said first and second light sensors include a photodiode, photoconductive device, photovoltaic cell, phototransistor, reverse biased light emitting diode, or a combination thereof.

13. The sensor assembly according to claim 8, wherein at least one of said first and second bandpass filters is configured to transmit a wavelength range of about 10 nm to about 20 nm, said wavelength range including the spectral sensitivity peak of the sensor associated with said bandpass filter.

14. The sensor assembly according to claim 8, wherein said first spectral sensitivity peak is about 555 nm.

15. The system according to claim 8, wherein said second spectral sensitivity peak is about 350 nm or about 800 nm.

16. The sensor assembly according to claim 8, wherein each of the plurality of sub-housings includes an interior wall that limits light reflection.

17. The sensor assembly according to claim 8, wherein said sensor assembly is installed in a manufactured light source.

18. The sensor assembly according to claim 8, further comprising a fourth sensor positioned in a fourth sub-housing of the plurality of sub-housings of the housing, the fourth sensor is calibrated approximately with photopic luminous efficiency.

19. A system for modulating a manufactured light source comprising:
a plurality of sensor assemblies installed in an environment, each of the plurality of sensor assemblies comprising:
a housing having two or more light sensors positioned in respective sub-housings, each of the two or more light sensors having corresponding spectral sensitivity peaks, wherein said first spectral sensitivity peak is within a manufactured light spectral range, and said second and additional spectral sensitivity peaks are within a spectral range of daylight and outside said manufactured light spectral range, said two or more light sensors configured to measure a radiant power density of light at a target location in said environment, and
a bandpass filter associated with each of said two or more light sensors, said bandpass filter positioned in the respective sub-housing to filter light transmitted to said associated light sensor; and
a control module for sending a signal to modulate a quantity and a phase of light transmitted by said manufactured light source according to a spectral characteristic determined by said light sensors radiant power density light measurements, said spectral characteristic being a ratio of daylight to said manufactured light source, phase of daylight, and average overall quantity, or a combination thereof;
wherein said plurality of sensor assemblies are positioned to measure a radiant power density of light at a plurality of target locations in said environment, said manufactured light source is an electric light source, said electric light source being a light-emitting diode, fluorescent light, discharge light, solid-state light, or a combination thereof, said manufactured light source is color-tunable, each of said plurality of sensor assemblies is installed in a respective one of a plurality of manufactured light sources, said control module is configured to modulate each of said plurality of manufactured light sources independently.

\* \* \* \* \*